Patented Nov. 22, 1938

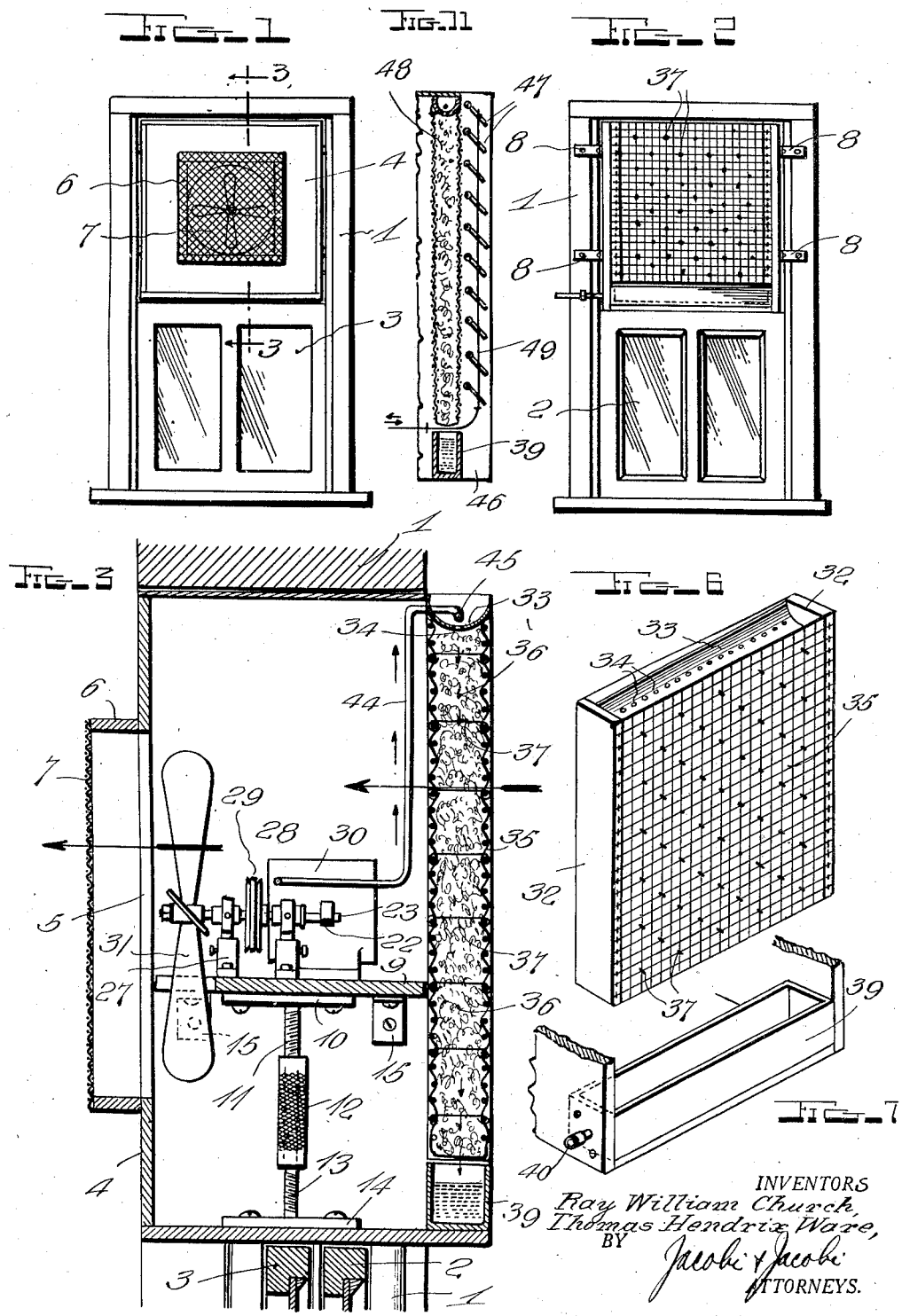

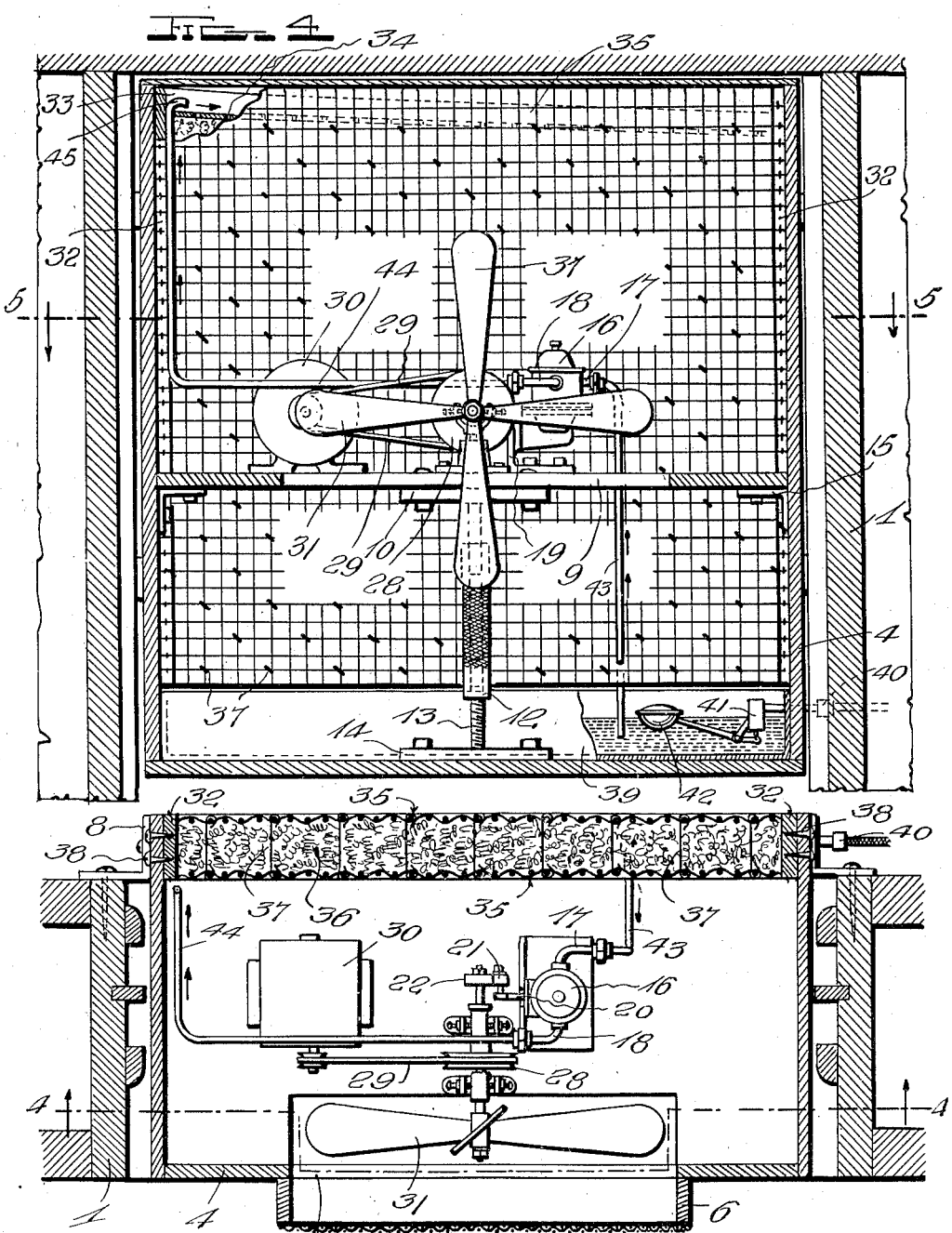

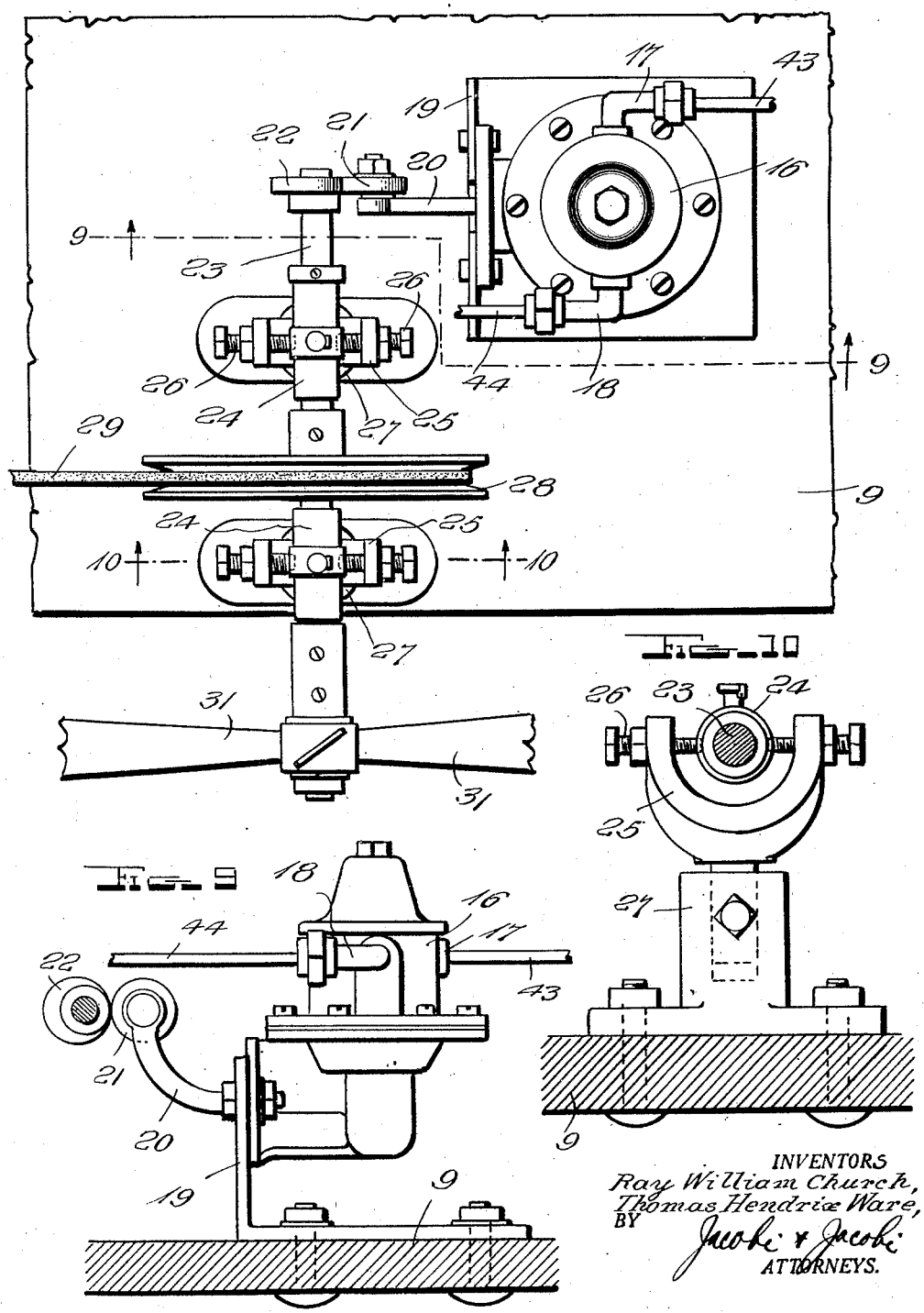

2,137,905

UNITED STATES PATENT OFFICE 2,137,905

AIR CONDITIONER

Ray W. Church and Thomas H. Ware, Seminole, Okla.

Application July 12, 1937, Serial No. 153,235

2 Claims. (Cl. 261—97)

Our invention relates to new and useful improvements in air conditioning apparatus and more particularly to that type of conditioning apparatus which filters the air, cools and circulates the same through a structure adjacent to which the apparatus is applied.

One of the principal objects of our invention is the provision of an apparatus wherein a moisture-containing unit is provided through which fresh air is constantly forced, the air being filtered of dust and other impurities and also cooled as it is forced through the moisture-providing unit to be circulated through the room or other structure to which the apparatus is applicable.

Still another object of the invention resides in a particular type of moisture and filtering unit which may be quickly and readily removed from the apparatus for cleansing and/or replacement, if necessary.

A further object of the invention resides in the provision of a moisture-providing and filtering unit in which a particular type of filtering medium is used which will have a tendency to retain the moisture for an appreciable length of time, so that air passing therethrough under pressure will be properly filtered and cooled at all times when the apparatus is in use, the filtering medium being subject to treatment for purposes of preservation and elimination of odors.

A still further object of the invention resides in the provision of a filtering medium consisting of excelsior formed from cypress or cedar, especially treated with a wood preservative to lengthen the life thereof and at the same time eliminate odors ordinarily due to the dampening of wood over a period of time.

Still another object of the invention resides in the provision of a filter and moistening unit in which the excelsior is uniformly distributed throughout the unit and retained in such uniform distribution throughout the use thereof, notwithstanding the constant application of water thereto when the apparatus is in use.

A still further object of the invention resides in the provision of a filtering and moistening unit provided with a plurality of staggered transverse elements designed and positioned to retain the excelsior contained therein in the uniform distribution throughout use, regardless of the constant application of water thereto.

A still further object resides in the provision of a mechanical assembly for use in providing the air-circulating medium and the water-circulating medium, which assembly is readily removable and readily adjustable to accommodate, respectively, ready cleansing and simple and ready fitting of the apparatus to windows or structures of various sizes and designs.

A still further object of the invention resides in the provision of a unit in which water is pumped steadily to a moisture-providing and filtering unit from which it is drained and returned to the pump for reuse, with the exception, of course, of the moisture which is evaporated into the air.

A still further object of the invention resides in an improved pump and fan assembly wherein a roller bearing is provided on the pump arm cooperating with an eccentric carried on the fan shaft, said shaft being capable of adjustment so that the eccentric thereon may take various positions with respect to the roller bearing on the pump arm, as may be desired.

With these and numerous other objects in view, our invention consists in the novel features of construction, combination and arrangement of parts as will be hereinafter referred to and more particularly pointed out in the specification and claims.

Referring to the drawings in which similar reference characters designate corresponding parts throughout the several views, Figure 1 is a front elevation of a window frame showing the application of the improved air cooling apparatus applied thereto, looking at the same from the inside of the structure;

Figure 2 is a similar view looking at the same from the outside of the window frame;

Figure 3 is a central vertical sectional view on an enlarged scale as seen on line 3—3 of Figure 1;

Figure 4 is a longitudinal sectional view as seen on the line 4—4 of Figure 5;

Figure 5 is a horizontal sectional view as seen on the line 5—5 of Figure 4;

Figure 6 is a perspective view of the filtering and moisture providing unit removed;

Figure 7 is a fragmentary, sectional view in perspective of the lower part of the apparatus upon which the filtering and moisture providing unit is supported, showing particularly the reservoir thereon;

Figure 8 is a plan view on an enlarged scale showing the arrangement of the fan, driving belt and pump structure;

Figure 9 is a transverse, vertical sectional view taken on the line 9—9 of Figure 8; and Figure 10 is a sectional view taken on the line 10—10 of Figure 8.

Figure 11 is a fragmentary vertical section of a modified form of air-conditioning unit, utilizing a plurality of adjustable louvers.

We appreciate the fact that various types of air conditioning units have been produced. Many of the same are on the principle involved in refrigeration which has certain objections from the standpoint of comfort, aside from the fact that the same are exceptionally expensive. It is desirable in an air conditioning unit for universal use to produce an apparatus which will filter the air to remove dust and extraneous matter therefrom, and circulate the same through the structure to which the apparatus is applied, but in the warm and hot months of the year, it is desirable also to provide a medium for the cooling of said air and circulating of the same through the structure. Likewise, in various localities, moistened air is essential to produce a certain amount of humidity. In our improved air conditioning apparatus, the difficulties heretofore encountered are overcome and the advantages desirable in a device of this character are present.

Referring more particularly to the drawings in which similar reference characters designate corresponding parts throughout the several views, the numeral 1 represents a window frame of any desired structure in which are slidably arranged in the usual fashion the upper and lower sashes 2 and 3, respectively. It may be here stated that while we have shown our apparatus in association with a window frame of the conventional type, our apparatus is applicable to any structure where an opening is provided for the entrance of air to said structure and whereas our device is also illustrated in the drawings as applied to the window frame between the top and the lower sash with the upper sash lowered also, the device is equally well adapted for use in the space between the upper sash and the lower sash, with the lower sash raised. We have found, however, that it is more desirable to utilize the device in the window frame between the top thereof and the top of the lower sash, with the upper sash lowered, as clearly illustrated in Figures 1, 2 and 3 of the drawings.

Our air conditioning unit as a whole comprises a box-like housing 4 of a size adapted to fit in a window frame between the top of the frame and the top of the lower sash, with the upper sash lowered, as shown in the drawings, although it may be of any desired size. This box-like housing has top, side and bottom walls and a front wall with an opening 5 therein of a predetermined size. There is no rear wall to this housing. The opening 5 is preferably rectangular in design, although it may be circular or any other formation desired and of a size equivalent to or slightly larger than the air circulating fan in the device to be hereinafter and more particularly described. Projecting from the front wall 4 surrounding the opening 5 therein is the extension 6 over the front of which is a screening or the like 7. The housing proper is secured removably and adjustably in the frame 1 through the medium of the angle plates 8, the arms of which are respectively screwed to the side walls of the housing and to the outer end walls of the frame 1, as clearly shown in Figures 2 and 5 of the drawings. Thus, while the entire device is securely held in position in the frame, it will be seen that it may be readily and quickly lowered or raised, according to the size of the opening in which it is placed or removed, when desired. If the walls of the housing do not closely contact the walls of the frame or opening in which the device is set, it will be understood that any desired form of extension board or the like may be engaged with the housing to cover up the spaces between the same and the frame or opening in which it is positioned to exclude the air from the structure except such air as may be drawn through the apparatus.

Positioned within the housing 4 at a predetermined location therein, is a horizontal support 9 removably carried on a plate 10 having a threaded stem 11 projecting or suspended therebelow. This threaded stem 11 operates in a threaded sleeve 12 which also engages a second threaded stem 13 projecting upwardly from a plate 14 which is removably secured to the bottom wall of the housing. This structure forms a turn buckle so that the supporting element 9 may be raised or lowered as desired and when adjusted to the proper position, said support 9 is secured in place by the angle plates 15.

This support 9 carries the motor, pump and fan assembly, as hereinafter described. A pump 16 of a conventional diaphragm type with an inlet 17 and an outlet 18 is mounted on the support 9 through the medium of a bracket 19. The rocker arm 20 of the pump carries on its free end a roller 21 which operates in contact with an eccentric 22 carried on the one end of a driven shaft 23 so that as the shaft is rotated rocking motion will be imparted to the arm and the pump operated. This driven shaft is supported in sleeves 24 which are adjustably supported between the arms of yoke members 25 through the medium of set screws 26. The yoke members are adjustably supported for vertical adjustment in the sockets 27 which are bolted to the support 9, as clearly shown in Figure 10 of the drawings. Thus, it will be seen that the shaft 23 may be adjusted vertically with respect to the support 9 and likewise, adjusted laterally so that the eccentric 22 carried thereon may have varied contact with the roller bearing 21 as may be desired.

This shaft 23 carries its pulley 28 over which extends the belt 29 operating from a motor 30. Carried on the opposite end of the shaft 23 is a fan 31 of any desired size and blades of any desired shape or design. The blades on the fan shown in the drawings are conventional.

As previously stated, the rear of the housing 1 is open. Mounted in this open rear end of the housing is our improved air moistening and filtering unit. This unit or element consists of a pair of side walls 32 between the upper ends of which is supported an inclined trough member 33 provided with a series of perforations 34. Extending over the front of the unit, the bottom thereof and the rear of same and secured to the edges of the wall 32 and trough 33 is a screening or the like formed preferably of hardware cloth same being represented in the drawings by the numeral 35. Thus, a substantially U-shaped formation is taken by this screening or hardware cloth 35 to form with said side walls 32 and the trough 33 substantially an inclosure. Packed within this inclosure is an excelsior filling forming a filtering medium. This excelsior is preferably formed from cypress or cedar wood especially treated with a wood preservative of well known character such as Pinetine or Patrotine so that when the excelsior becomes saturated for a length of time with moisture, it will not become soured and give off objectionable odors. We have found that excelsior is far superior to any other filling which may be used as a filter where moisture is to be retained during the process of sucking air therethrough.

For purposes of identification, the excelsior in the apparatus as shown in the drawings is designated by the numeral 36. As this excelsior is to be saturated with water passing thereover, it is desirable to provide means to keep the excelsior equally distributed throughout the unit at all times. This is accomplished by providing a plurality of transverse wires through the filtering unit, same being designated in the drawings by the numeral 37. These wires are looped or engaged at their ends with the wires of the hardware cloth 35 at the front and rear of the unit and are arranged in staggered relation throughout the area thereof, as clearly shown in Figures 4 and 6 of the drawings. As many of such supporting wires 37 may be provided as are found desirable and we do not wish to be limited to the number shown in the drawings. In view of the fact that it is known that excelsior when moistened or dampened will have a tendency to sag, it will be appreciated that the provision of the plurality of supporting transverse wires 37 will retain the filling or filtering medium 36 in an equally distributed position at all times.

This filtering and air moistening unit is secured between the side walls of the housing 4 by means of the screws 38, as shown in Figure 5 of the drawings, and obviously, the entire unit is capable of quick and ready removal or replacement as and when desired.

Mounted on the bottom of the housing below and in alignment with the filtering unit is a reservoir 39 adapted to be filled with water through the inlet 40. This inlet operates in connection with a valve 41 controlled through the medium of the float 42, as shown in Figure 4 of the drawings.

Leading into the reservoir 39 is an inlet conduit 43 which communicates with the inlet 17 of the pump 16 whereby the water from the reservoir may be pumped upwardly therefrom and obviously, when the level of the water in the reservoir has reached a predetermined low point, the float 42 will open the valve 41 to permit the reservoir to be refilled. Connected with the outlet 18 of the pump 16 is an outlet conduit 44 which extends horizontally and then vertically through the housing terminating in a curved free end 45 in the one end of the trough 33, as clearly shown in Figures 3 and 4 of the drawings.

Thus, it will be seen that the water pumped from the reservoir 39 is carried to the one end of the trough 33 where it is distributed from the trough through the apertures or perforations 34 into the filtering medium 35. This water will trickle through the openings onto the excelsior and saturate the latter as well as trickle downwardly through the same back into the reservoir 39. The excelsior being absorbent will retain the moisture to some extent but the flow of water will be such that a certain amount will be drained off into the reservoir where it may be used again in the constant circulating system. As the pump is operated to feed the water through the filtering and moistening medium, the fan 31 will be operated to suck the air through the filtering and moistening unit and project it through the screen 7 into the structure to which the apparatus is applied.

Thus, as the air is sucked through the filtering medium all dust and extraneous matter will be deposited on the excelsior and the air sucked therethrough will be moistened and driven through the screen 7 into the structure or room so that the air circulated by said fan will be cooled and filtered simultaneously. The air in the room or structure to which this apparatus is applied is, therefore, conditioned satisfactorily with a simple and efficient apparatus at a comparatively low cost. The filtering medium is removable so that in the event parts become worn, same may be replaced at little expense or should it be desired to cleanse the device, it may be readily disassembled for that purpose. The uniform distribution of the excelsior in this filtering medium assures the operator that substantially all air sucked into the device will be cleansed and moistened. The mechanical assembly including the fan, pump and motor, is capable of quick and ready adjustment or removal, when and if desired. This assures the owner of such apparatus that same may be adapted for use in various types of windows or other structures where such a device is desired to be set up. The treatment of an excelsior formed of cypress or cedar also assures of the elimination of odors ordinarily incident to wet and soured wood.

In Figure 11 we have shown a slightly modified form of an invention, wherein provision is made for protecting the filter element from the direct rays of the sun, for more evenly distributing the incoming air, for protecting the mechanical assembly from rain and other elements and to prevent the fan from pulling or drawing too much moisture from the filter. In this modification we have shown the walls of the housing slightly extended beyond that illustrated in the previously described form, said walls being designated by the numeral 46, and between the extended portions of the walls we have provided a plurality of pivotal supported louvers 47. These louvers are disposed just beyond the filtering element which is herein designated numeral 48, and said louvers are connected together by means of a flexible connection such as wire or the like 49. The wire or connection 49 is bent and extended below the filtering element and into a convenient position within the structure, to be manually adjusted as desired.

These louvers are preferably of metal, although same may be made of any desired material, and will serve to protect the filtering element from the direct rays of the sun and are so arranged that the incoming air passing therethrough is more evenly distributed. Further, said louvers will protect the mechanical assembly from rain or other elements which may blow through the filter and obviously will protect the interior of the room from same. Furthermore, these louvers will prevent the fan from drawing in too much moisture from the filter and thereby increase the efficiency of the device. Still further, these louvers will improve the general appearance of the unit.

From the foregoing description of the construction of our improved apparatus, the operation thereof will be readily understood and it will be seen that we have provided a simple, inexpensive and efficient means for carrying out the objects of the invention. While we have particularly described the elements best adapted to perform the functions set forth, it is obvious that various changes in form, proportion and in the minor details of construction, may be resorted to without departing from the spirit or sacrificing any of the principles of the invention.

Having thus described the invention, what we claim is:

1. In an air conditioning apparatus of the class described, a housing provided with an air outlet in a predetermined position in one wall thereof, an air filtering member in the opposite wall of said housing, a fan and driving means therefor within the housing, a support for said fan and driving means, a vertically adjustable standard for vertically adjusting said support within the housing and supporting the support in place to position the fan in predetermined relation to the air outlet, and means for securing the support to the housing in an adjusted position.

2. In an air conditioning apparatus of the class described, a housing having one wall thereof open, an air filtering and moistening unit movably applied to the housing in the open wall thereof, said unit comprising a pair of spaced side walls, an inclined perforated trough connecting said side walls at the upper ends thereof, wire cloth applied to the said walls forming front, rear and bottom walls for said unit and engaging side edges of said trough, a filling of excelsior within the walls of said unit packed tightly therein to cover the entire area thereof, means extending transversely of the unit and connected with the front and rear walls thereof to support said excelsior and prevent sagging thereof, a pan in said housing below and in alignment with the bottom of said unit to collect water as it is drained by gravity from said excelsior filling, and means for delivering water from said pan back into said trough.

RAY W. CHURCH.
THOMAS H. WARE.